United States Patent
Chauvin et al.

(10) Patent No.: US 11,984,943 B2
(45) Date of Patent: *May 14, 2024

(54) ACTIVE NEAR-FIELD COMMUNICATION DEVICE FACILITATION OF LOW POWER CARD DETECTION

(71) Applicant: Apple Inc., Cupertino, CA (US)

(72) Inventors: Vincent Chauvin, San Francisco, CA (US); Peter M. Agboh, Burlingame, CA (US); Vusthla Sunil Reddy, Cupertino, CA (US); Xinping Zeng, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/236,986

(22) Filed: Apr. 21, 2021

(65) Prior Publication Data

US 2021/0306032 A1   Sep. 30, 2021

Related U.S. Application Data

(63) Continuation of application No. 16/571,027, filed on Sep. 13, 2019, now Pat. No. 11,005,533.

(60) Provisional application No. 62/731,780, filed on Sep. 14, 2018.

(51) Int. Cl.
| | |
|---|---|
| *H04B 5/00* | (2006.01) |
| *H04W 4/80* | (2018.01) |
| *H04W 12/63* | (2021.01) |

(52) U.S. Cl.
CPC ......... *H04B 5/0031* (2013.01); *H04B 5/0081* (2013.01); *H04W 4/80* (2018.02); *H04W 12/63* (2021.01)

(58) Field of Classification Search
CPC .................................................... H04B 5/0031
See application file for complete search history.

(56) References Cited

U.S. PATENT DOCUMENTS

| | | | | |
|---|---|---|---|---|
| 2,992,384 A | * | 7/1961 | Malbrain | G01R 23/10 324/76.15 |
| 2007/0194746 A1 | * | 8/2007 | Yoshimoto | H02M 7/53875 318/801 |
| 2009/0043361 A1 | | 2/2009 | Baumgartner | |
| 2012/0045989 A1 | | 2/2012 | Suumaki | |
| 2012/0289239 A1 | | 11/2012 | Luna | |
| 2013/0143487 A1 | | 6/2013 | Hillan | |
| 2013/0324036 A1 | | 12/2013 | Hillan | |
| 2015/0201338 A1 | * | 7/2015 | Gopal | H04W 72/0446 370/252 |

* cited by examiner

*Primary Examiner* — Hsinchun Liao
(74) *Attorney, Agent, or Firm* — BAKERHOSTETLER

(57) ABSTRACT

A device implementing a system for NFC communication includes a processor configured to receive, from an other device, pulse signals for detecting proximity of the device with the other device. The processor is further configured to determine an interval at which the pulse signals are received from the other device. The processor is further configured to determine a time when the other device is expected to transmit a subsequent pulse signal based at least in part on the determined interval. The processor is further configured to transmit a signal to the other device based on the determined time when the other device is expected to transmit the subsequent pulse signal.

21 Claims, 10 Drawing Sheets

ACTIVE NEAR-FIELD COMMUNICATION DEVICE FACILITATION OF LOW POWER CARD DETECTION

CROSS-REFERENCE TO RELATED APPLICATIONS

The present application is a Continuation of U.S. patent application Ser. No. 16/571,027, entitled "ACTIVE NEAR-FIELD COMMUNICATION DEVICE FACILITATION OF LOW POWER CARD DETECTION," filed Sep. 13, 2019, which claims the benefit of U.S. Provisional Patent Application Ser. No. 62/731,780, entitled "ACTIVE NEAR-FIELD COMMUNICATION DEVICE FACILITATION OF LOW POWER CARD DETECTION," filed Sep. 14, 2018, each of which is hereby incorporated herein by reference in its entirety and made part of the present U.S. Utility Patent Application for all purposes.

TECHNICAL FIELD

The present description relates generally to active near-field communication (NFC) device facilitation of low power card detection (LPCD).

BACKGROUND

NFC enables electronic devices to establish communication when the electronic devices are within a close distance (e.g., 10 cm) of each other. However, the use of NFC may result in high and/or continuous power consumption, for example, when an NFC reader is scanning and/or polling to detect nearby cards and/or devices. The high and/or continuous power consumption may contribute to battery drain on a battery-powered device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
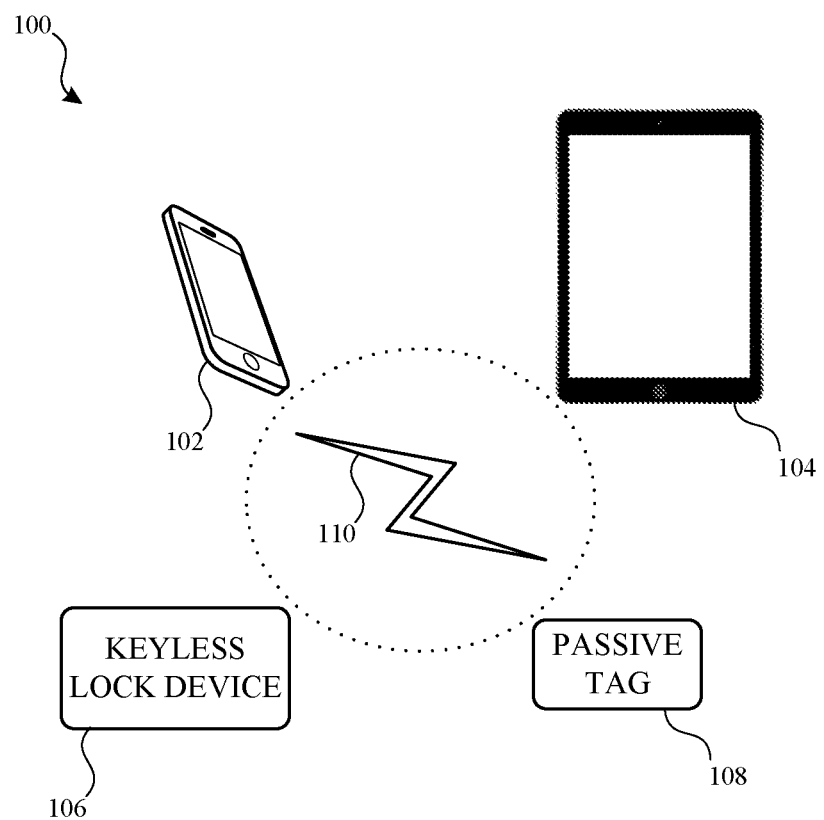
FIG. 1 illustrates an example computing environment for initiating NFC communication in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Certain NFC reader operations, such as full polling for nearby NFC devices, may be associated with high and/or continuous power consumption which may contribute to battery drain on a battery powered device. LPCD corresponds to a low power polling mode for searching and detecting the presence of other NFC device(s) with the purpose of limiting power consumption (e.g., as compared to the full polling). In LPCD, an NFC reader device transmits multiple pulse signals at a predefined interval and predefined duration, to detect proximity of another NFC device. When the other NFC device enters proximity of the NFC reader device, the loading on the antenna of the NFC reader device may change. The NFC reader device may detect variation in measurement parameters of the antenna (e.g., variation in amplitude, phase, impedance, etc.), and this variation may indicate the presence of the other device which initiates the aforementioned full polling (e.g., for data transfer between the devices).

In addition to an NFC interface, the NFC reader device may include other types of wireless interfaces (e.g., cellular, Bluetooth, WiFi, Zigbee and the like), one or more of which may re-tune the antenna of the NFC reader device when in use (e.g., when receiving and/or transferring data). This re-tuning may vary antenna amplitude and/or phase variation, and therefore may incorrectly indicate the presence of another NFC device (e.g., a passive tag or an active NFC device emulating a passive tag) for LPCD purposes. Thus, the re-tuning may trigger a false positive with respect to the LPCD polling which may cause the NFC reader device to initiate the full polling, thereby resulting in unnecessary battery drain (e.g., for a battery powered device).

Thus, in one or more implementations, the subject system may be configured to reduce the likelihood that the re-tuning of the antenna by wireless interface(s) is incorrectly attributed to presence of the other NFC device, thereby preventing the battery drain resulting from an unnecessary full polling. The subject system provides for the NFC reader device to detect, in response to the multiple pulse signals transmitted for LPCD purposes, a first change in measurement parameter(s) of the antenna. Instead of automatically determining that the first change in measurement parameters corresponds to the presence of the other NFC device (and initiating the full polling), the NFC reader device may transmit a confirmation pulse signal. The NFC reader device may then detect a second change in measurement parameter(s) in its antenna based on the antenna measurement variation from the confirmation pulse signal relative to that from the prior pulse signal(s). If the second change is consistent with the change expected from the presence of an NFC device, NFC reader device may initiate full polling (e.g., for receiving data from the other NFC device). If the second change is inconsistent with the change expected from the presence of an NFC device, this may indicate that the antenna was re-tuned by a wireless interface, and the NFC reader device may refrain from initiating full polling.

Moreover, in one or more implementations the subject system may provide for an increased detection range for NFC reader devices performing LPCD, such as when the NFC reader device and the other NFC device are both active devices (e.g., with their own respective power supplies, such as batteries). For example, the NFC reader device may be a point-of-sale device (e.g., a tablet computer or a stationary device) and the other NFC device may be a user's mobile device (e.g., a mobile phone or smartwatch). The NFC antenna on the mobile device may be small (e.g., resulting in small loading for the antenna of the NFC reader device) and/or the positioning of the mobile device may be suboptimal (e.g., due to the angle at which a user holds the mobile device relative to the NFC reader device). This may further reduce the distance at which the devices may detect each other, and communicate, via NFC.

Thus, in cases where the other NFC device is also an active device (e.g., a mobile device), the other NFC device may receive, from the NFC reader device, multiple pulse signals in association with LPCD. The other NFC device may determine an interval at which the multiple pulse signals are received from (e.g., or transmitted by) the NFC reader device. Based on the interval, the other NFC device may schedule transmission of a signal for sending to the NFC reader device, where the transmitted signal is configured to effect a change in measurement parameter(s) on an antenna of the NFC reader device, with the intent to trigger full polling by the NFC reader device. In this manner, the detection range of the NFC reader device may be increased by way of the signal that is actively transmitted by the other NFC device.

FIG. 1 illustrates an example computing environment for initiating NFC communication in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The computing environment 100 includes electronic devices 102, 104, 106 and 108 (hereinafter 102-108), configured to communicate with each other via a near-field communication (NFC) connection 110. As noted above, NFC corresponds to a wireless communication protocol (e.g., or a set of wireless communication protocols) that enables two electronic devices to establish communication by bringing them within short distance (e.g., 10 cm) of each other. In the example of FIG. 1, the NFC connection 110 may communicatively couple, for example, any two or more of the electronic devices 102-108. For explanatory purposes, the computing environment 100 is illustrated in FIG. 1 as including electronic devices 102-108; however, the computing environment 100 may include any number of electronic devices.

One or more of the electronic devices 102-104 may be, for example, a portable computing device such as a laptop computer, a smartphone, a smart speaker, a peripheral device (e.g., a digital camera, headphones), a tablet computer, a wearable device such as a smartwatch, a band, and the like. One or more of the electronic devices 102-104 may include one or more wireless interfaces, such as near field communication (NFC) radios, WLAN (e.g., WiFi) radios, cellular radios, Bluetooth radios, Zigbee radios, and/or other wireless radios. In FIG. 1, by way of example, the electronic device 102 is depicted as a smartphone and the electronic device 104 is depicted as a tablet device.

In the example of FIG. 1, the electronic device 106 is a keyless access device configured for NFC communication. The keyless access device may be a powered device (e.g., battery powered) coupled to a physical lock (e.g., for access to a car, bicycle, house, and the like), and configured to lock and/or unlock the physical lock upon detection of a passive tag (e.g., a key fob or an emulated key fob).

The electronic device 108 may be a passive tag configured for NFC communication. For example, the electronic device 108 may be a passive data store which can be read, and in some cases be written to by an NFC device (e.g., the electronic devices 102-104). In one or more implementations, the electronic device 108 may not include an internal power source, and instead be powered through inductive coupling with a nearby NFC reader device (e.g., the electronic devices 102-106).

In one or more implementations, the passive tag corresponding to the electronic device 108 may store personal data (e.g., debit or credit card information, loyalty program data, personal identification numbers (PINs), contacts, and/or the like). For example, this personal data may be stored in the form of a physical card and/or credential (e.g., a debit card, a credit card, a loyalty program card, a transit card, and/or the like), where the passive tag is integrated within the card. In another example, the passive tag corresponding to the electronic device 108 may store keyless access data for locking/unlocking a keyless access device (e.g., the electronic device 106).

In one or more implementations, one or more of the electronic devices 102-104 may be configured to emulate a passive tag (e.g., the passive tag corresponding to the electronic device 108). For example, one or more of the electronic devices 102-104 may include software and/or firmware configured as a virtual representation of an electronic card and/or credential (e.g., a debit card, a credit card, a loyalty program card, a transit card, and/or the like) and/or a key fob that emulates a passive tag(s).

In one or more implementations, the electronic devices 102-106 may be configured to poll for nearby NFC devices using low power card detection (LPCD). As noted above, LPCD corresponds to a mode by an NFC reader device (e.g., one or more of the electronic devices 102-106) for searching and detecting the presence of another NFC device, with the purpose of limiting power consumption. The other NFC device can be a passive tag (e.g., the electronic device 108 and/or one of electronic devices 102-104 emulating a passive tag), or can be an active NFC device (e.g., one or more of the electronic devices 102-106).

To limit power consumption, the NFC reader device (e.g., one or more of the electronic devices 102-106) transmits pulse signals in association with a first polling, where the first polling is for detecting proximity of another NFC device (e.g., where proximity corresponds to being within a near-field operational range, such as centimeters or tens of centimeters). Once the other NFC device (e.g., passive tag or device emulating a passive tag) enters proximity of the NFC reader device, the loading on the antenna may slightly change, and the NFC reader device may detect the amplitude and/or phase variation in the antenna measurements during the LPCD pulse, thereby indicating the possible presence of the other device. In the subject system, the NFC reader device may then transmit a confirmation pulse signal to confirm the presence of the other NFC device, e.g., instead of immediately performing a full polling. If the confirmation pulse signal confirms the presence of the other NFC device, the NFC reader device may then initiate the full polling.

In one or more implementations, full polling corresponds to activating hardware and/or firmware on the NFC reader device, for performing a transaction with the other NFC device. In a case where both devices are active devices, full polling may include any operations necessary to perform the transaction, such as a handshake and/or initiation between the devices.

In one or more implementations, the NFC reader device and the other NFC device may both be active devices. In this scenario, the other NFC device may determine an interval by which the NFC reader device sends pulse signals (e.g., LPCD pulse signals), and may schedule transmission of a signal to the NFC reader device based on the determined interval. The transmission of the signal to the NFC reader device may effect a change in a measurement parameter on the antenna of the NFC reader device and may thereby cause the NFC reader device to detect the presence of the other NFC device, e.g., at a greater detection range than would be achievable by the NFC reader transmitting alone.

Figure 2:
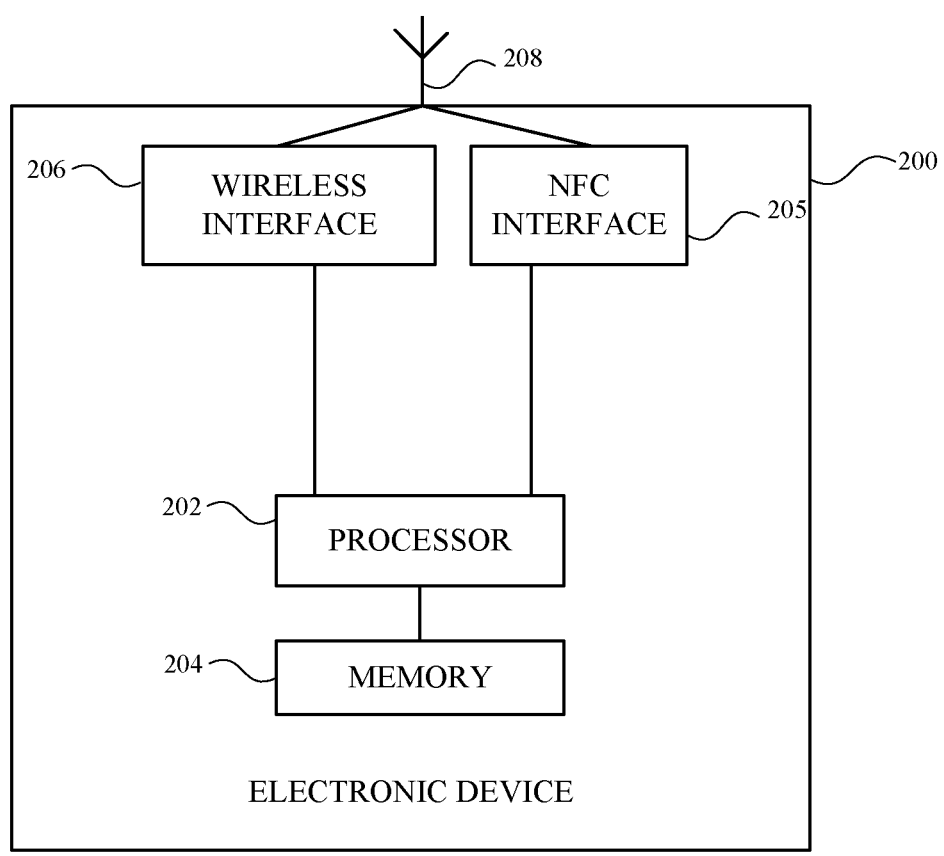
FIG. 2 illustrates an example device that may implement a system for initiating NFC communication in accordance with one or more implementations.

FIG. 2 illustrates an example device that may implement a system for initiating NFC communication in accordance with one or more implementations. For example, the device 200 of FIG. 2 can correspond to any of the electronic devices 102-106. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, an NFC interface 205, a wireless interface 206 and an antenna 208. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200. In the subject system, the processor 202 may implement architecture(s) for initiating NFC communication.

For explanatory purposes the processor 202 is illustrated as a single component. However, in one or more implementations, the processor 202 may be two or more processors, such as a host processor of the device 200 and a secure processor of the device 200. In the instance that the device 200 includes a secure processor, the secure processor may be in direct communication with the NFC interface 205, but not the secure processor may or may not be in communication with the wireless interface 206.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The NFC interface 205 may be an NFC integrated circuit (IC) that may include, for example, an NFC controller. The NFC interface 205 may be able to communicate via one or more different NFC communication protocols, such as NFC-A (or Type A), NFC-B (or Type B), and/or NFC-F (or Type F or FeliCA). The NFC-A protocol may be based on International Organization for Standardization (ISO)/International Electrotechnical Commission (IEC) 14443A and may use Miller bit coding with a 100 percent amplitude modulation. The NFC-B protocol may be based on ISO/IEC 14443B and may use variations of Manchester encoding along with a 10 percent modulation. The NFC-F protocol may be based on FeliCA JIS X6319-4 and may use a slightly different variation of Manchester coding than the NFC-B protocol.

The wireless interface 206 may include suitable logic, circuitry, and/or code that enables wired or wireless communication, such as between any of the electronic devices 102-104. The wireless interface 206 may further include, for example, one or more of a Bluetooth communication interface, a cellular interface, a Zigbee communication interface, a WLAN (e.g., WiFi, WiMAX, LiFi) communication interface, a USB communication interface, or generally any communication interface. In one or more implementations, all or part of the NFC interface 205 may be integrated into the wireless interface 206.

In one or more implementations, the wireless interface 206 may operate at a different frequency and/or bandwidth than the NFC interface 205. Thus, in order to optimize performances for the operating frequency and/or bandwidth for the wireless interface 206, the wireless interface 206 may tune the antenna 208 prior to transmitting and/or receiving.

Thus, the antenna 208 may be tuned (and used) for transmission/reception of signals by the wireless interface 206, and all or part of the antenna 208 may also be used for transmission/reception of signals by the NFC interface 205, e.g., for transmission of pulse signals in conjunction with performing LPCD. In one or more implementations, the antenna 208 may represent the entire antenna used by the wireless interface 206 and the entirety or a portion of the antenna used by the NFC interface 205. Thus, there may be one or more additional antenna components (not shown) that are used by the NFC interface 205, e.g., in addition to the entirety or the portion of the antenna 208 used by the NFC interface 205. For explanatory purposes, the antenna 208 is illustrated as protruding from the device 200; however, all or part of the antenna 208 may be integrated into the device 200, such as integrated into a surface of the device 200.

In one or more implementations, an internal power supply (e.g., a battery) may be used to supply power to one or more of the processor 202, the memory 204, the NFC interface 205, the wireless interface 206 and/or the antenna 208. In addition, one or more of the processor 202, the memory 204, the NFC interface 205, the wireless interface 206 and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
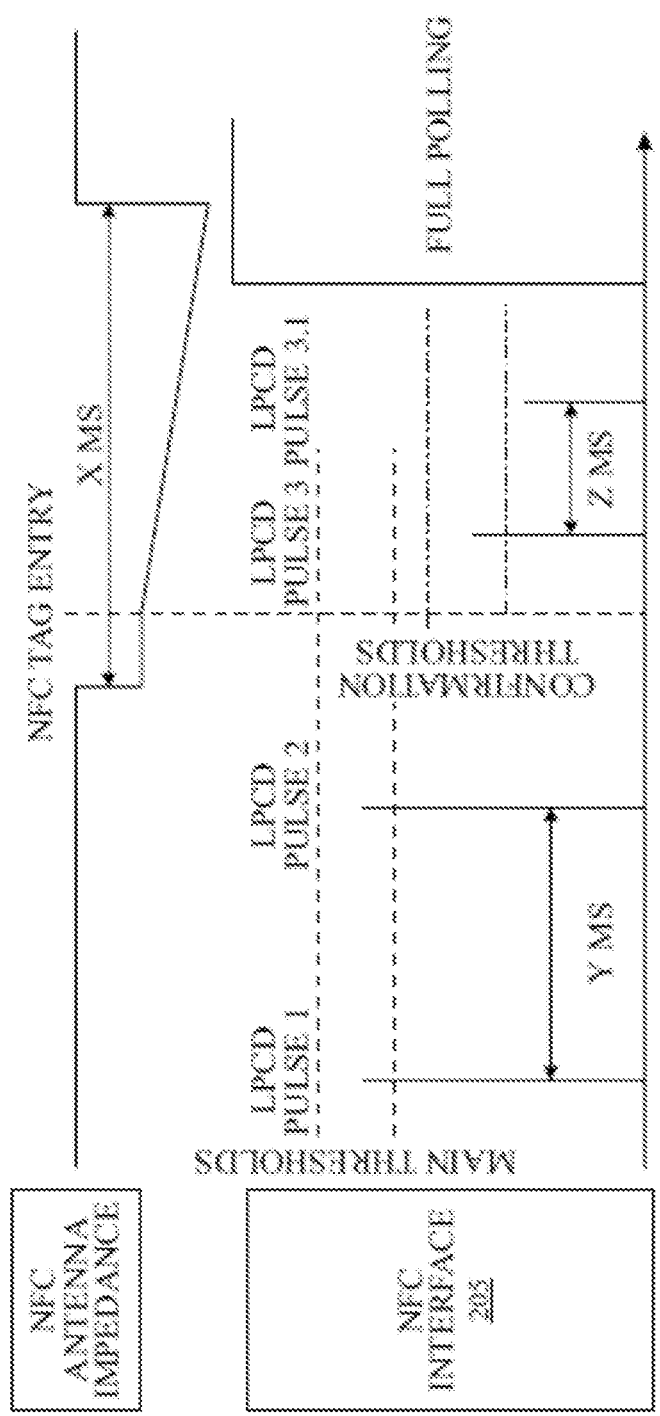
FIG. 3 illustrates an example timing diagram corresponding to transmitting a confirmation pulse signal to determine whether the detected change in measurement parameters should be attributed to the presence of an NFC device when the NFC device is present in accordance with one or more implementations.

FIG. 3 illustrates an example timing diagram corresponding to transmitting a confirmation pulse signal to determine whether the detected change in measurement parameters should be attributed to the presence of an NFC device when the NFC device is present in accordance with one or more implementations. While FIG. 3 is described with reference to the electronic device 102 as an NFC reader device, it is possible to use any of the electronic devices 102-106 as the NFC reader device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

For explanatory purposes, FIG. 3 illustrates a variation in antenna impedance; however variation in other measurement parameter(s) (e.g., amplitude, phase, and/or transmission current) may be used instead of, or as a supplement to, variation in antenna impedance. In one or more implementations, the main thresholds illustrated in FIG. 3 may be set based on pre-defined values and/or may be set based on a running average of measurement parameter values detected in conjunction with previously transmitted LPCD pulses, such as to account for any environmental conditions that may impact wireless communication.

The electronic device 102 may send multiple pulse signals, for example, where each signal is a 13.56 MHz carrier signal sent for a predefined duration (e.g., ≤200 μs) at a predefined interval (e.g., ≤900 ms). For example, the predefined duration may be set to ~100 μs with a predefined interval of 330 ms. The electronic device 102 (e.g., via an NFC controller input pin) may be configured to measure various parameters (e.g., amplitude, impedance, phase, and/or transmission current) from the antenna 208, and to compare these parameters to measurements at previous intervals.

When the electronic device 102 enters proximity of another device (e.g., a passive tag such as the electronic device 108, an emulated tag, or an active device such as the electronic devices 102-106), the loading on the antenna 208 will typically change. The electronic device 102 (e.g., via an NFC controller) may detect a variation in the parameters (e.g., a variation in amplitude, phase variation and/or transmission current). This variation in parameters may indicate proximity of the other device, to initiate a full polling. However, before initiating the full polling, the electronic device 102 may transmit a confirmation pulse signal, e.g. to confirm that the variation in parameters is not due to re-tuning of the antenna by the wireless interface 206.

As shown in the example of FIG. 3, there is no (e.g., or negligible) variation in antenna impedance between LPCD pulses 1 and 2 (e.g., where the pulse interval is Y ms). However, the variation in antenna impedance between LPCD pulses 2 and 3 is outside of the main threshold value. Instead of triggering full polling at this stage (as may be done in conventional systems), the electronic device 102 of the subject system may be configured to send a confirmation pulse signal (e.g., LPCD pulse 3.1) after LPCD pulse 3. The confirmation pulse signal is an additional pulse signal that is sent in response to detecting the change in antenna impedance outside of the main thresholds.

In one or more implementations, the confirmation pulse signal is sent to determine if the variation in antenna impedance is either continuous (e.g., corresponding to the electronic device 108 approaching or leaving) or corresponds to a discrete step (e.g., due to antenna re-tuning from the wireless interface 206). In this regard, the interval for sending the confirmation pulse signal (e.g., the additional LPCD pulse 3.1), is Z ms, which may be shorter than the pulse interval of Y ms. In addition, the confirmation pulse signal may be subject to a confirmation threshold which is different than the main threshold (and the confirmation threshold may be set based on the value of the measurement parameter for the prior LPCD pulse signal) but maintains a same or similar slope/speed to account for an approaching NFC device. The timing of the confirmation pulse signal can be based on the LPCD pulse signal interval (e.g., Y ms) and on the antenna impedance change period (e.g., X ms), so as to increase the probability of having the confirmation pulse signal (e.g., LPCD pulse 3.1) in the same antenna state as the LPCD pulse (e.g., LPCD pulse 3) which triggered the detection. In the example of FIG. 3, the variation in antenna impedance is continuous (e.g., the LPCD pulse 3.1 is outside of the confirmation thresholds), and therefore triggers full polling.

Figure 4:
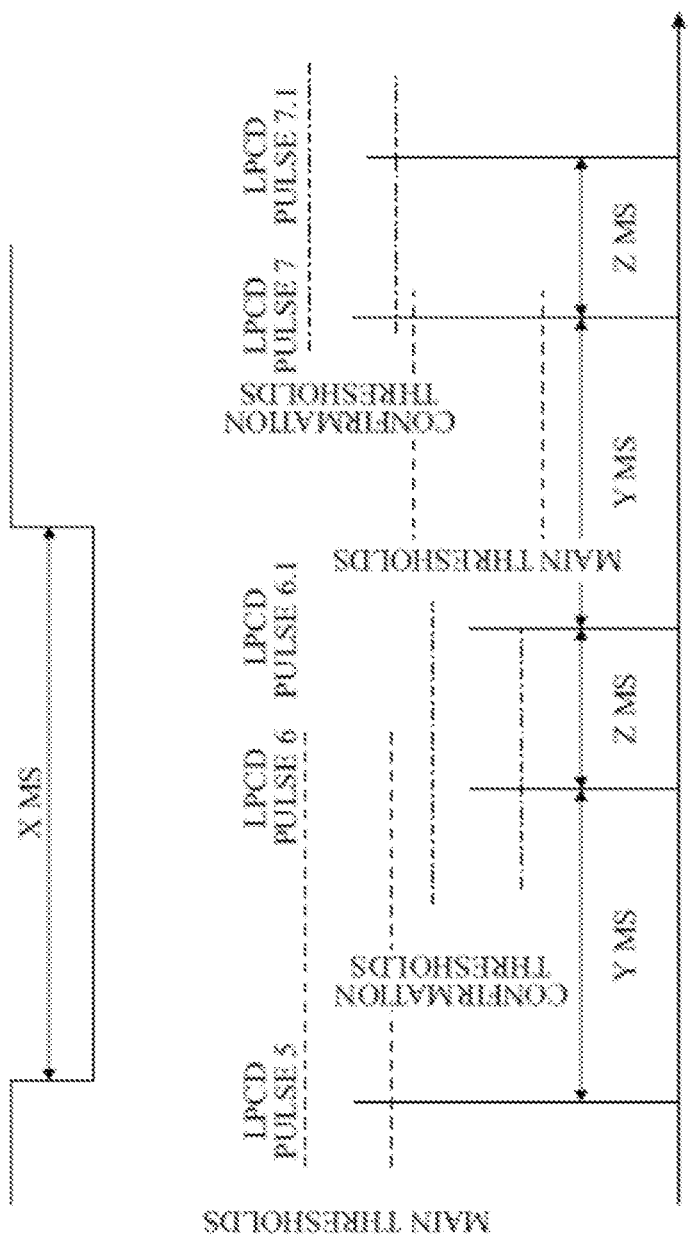
FIG. 4 illustrates an example timing diagram corresponding to transmitting a confirmation pulse signal to determine whether the detected change in measurement parameters should be attributed to the presence of an NFC device when the NFC device is not present in accordance with one or more implementations.

FIG. 4 illustrates an example timing diagram corresponding to transmitting a confirmation pulse signal to determine whether the detected change in measurement parameters should be attributed to the presence of an NFC device when the NFC device is not present in accordance with one or more implementations. While FIG. 4 is described with reference to the electronic device 102 as an NFC reader, it is possible to use any of the electronic devices 102-106 as the NFC reader device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Figure 6:
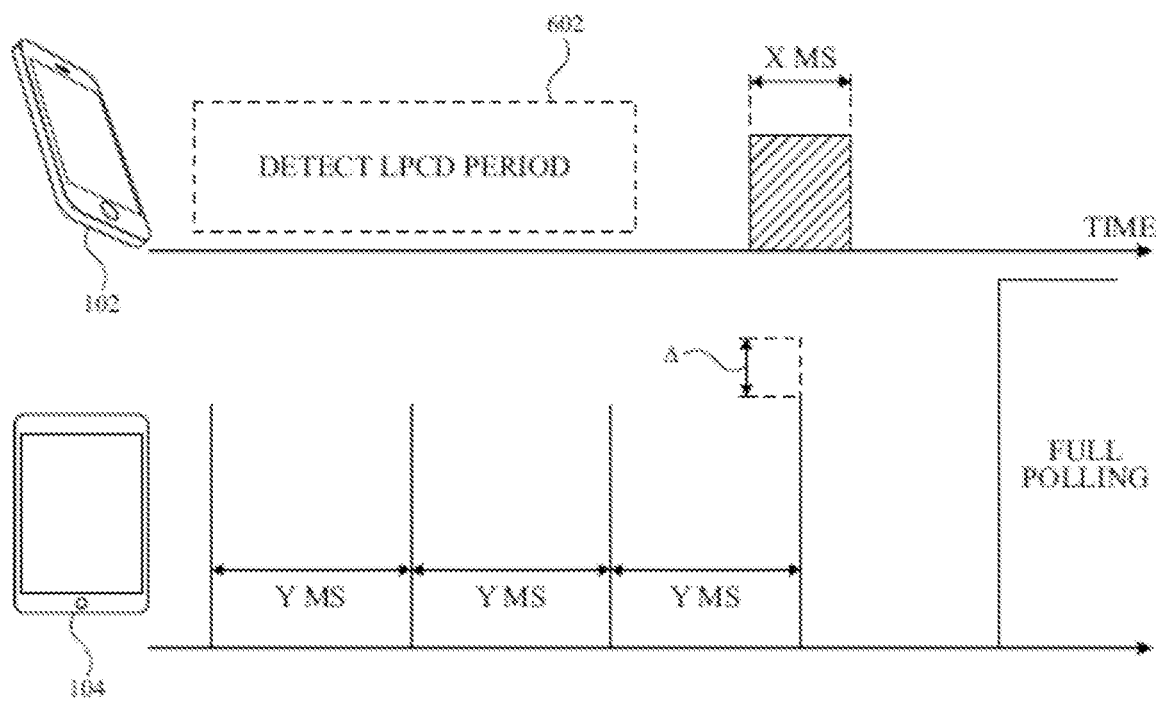
FIG. 6 illustrates an example of transmitting a signal by an active NFC device based on an interval by which pulse signals are received from an NFC reader device in accordance with one or more implementations.

For explanatory purposes, FIG. 4 is described with respect to variation in antenna impedance; however, variation in other measurement parameter(s) (e.g., amplitude, phase, and/or transmission current) may be used instead of, or as a supplement to, variation in antenna impedance. As shown, the variation in antenna impedance between LPCD pulse 5 and 6 falls outside of the main thresholds. In response, the electronic device 102 sets the confirmation thresholds around the antenna impedance for LPCD pulse 6, and the electronic device 102 sends a confirmation pulse signal (e.g., LPCD pulse 6.1) Z ms after LPCD pulse 6. As shown in FIG. 6, the antenna impedance determined for LPCD pulse 6.1 is within the confirmation thresholds, and therefore the variation may correspond to a discrete step (e.g., due to antenna re-tuning from one or more of the wireless interfaces 504-506), and does not trigger full polling. Instead, the main thresholds are adjusted around the measurement values determined in conjunction with LPCD pulse 6 and 6.1.

LPCD pulse 7 is then transmitted Y ms after LPCD pulse 6.1, and results in an antenna impedance outside of the adjusted main thresholds. Accordingly, the confirmation thresholds are adjusted around the antenna impedance for LPCD pulse 7, and the electronic device 102 sends a confirmation pulse signal (e.g., LPCD pulse 7.1), Z ms after LPCD pulse 7. Since the antenna impedance for LPCD pulse 7.1 is within the confirmation thresholds, the electronic device 102 does not initiate the full polling. Thus, in the example shown in FIG. 4, the subject system allows the electronic device 102 to avoid two unnecessary full polling operations.

Figure 5:
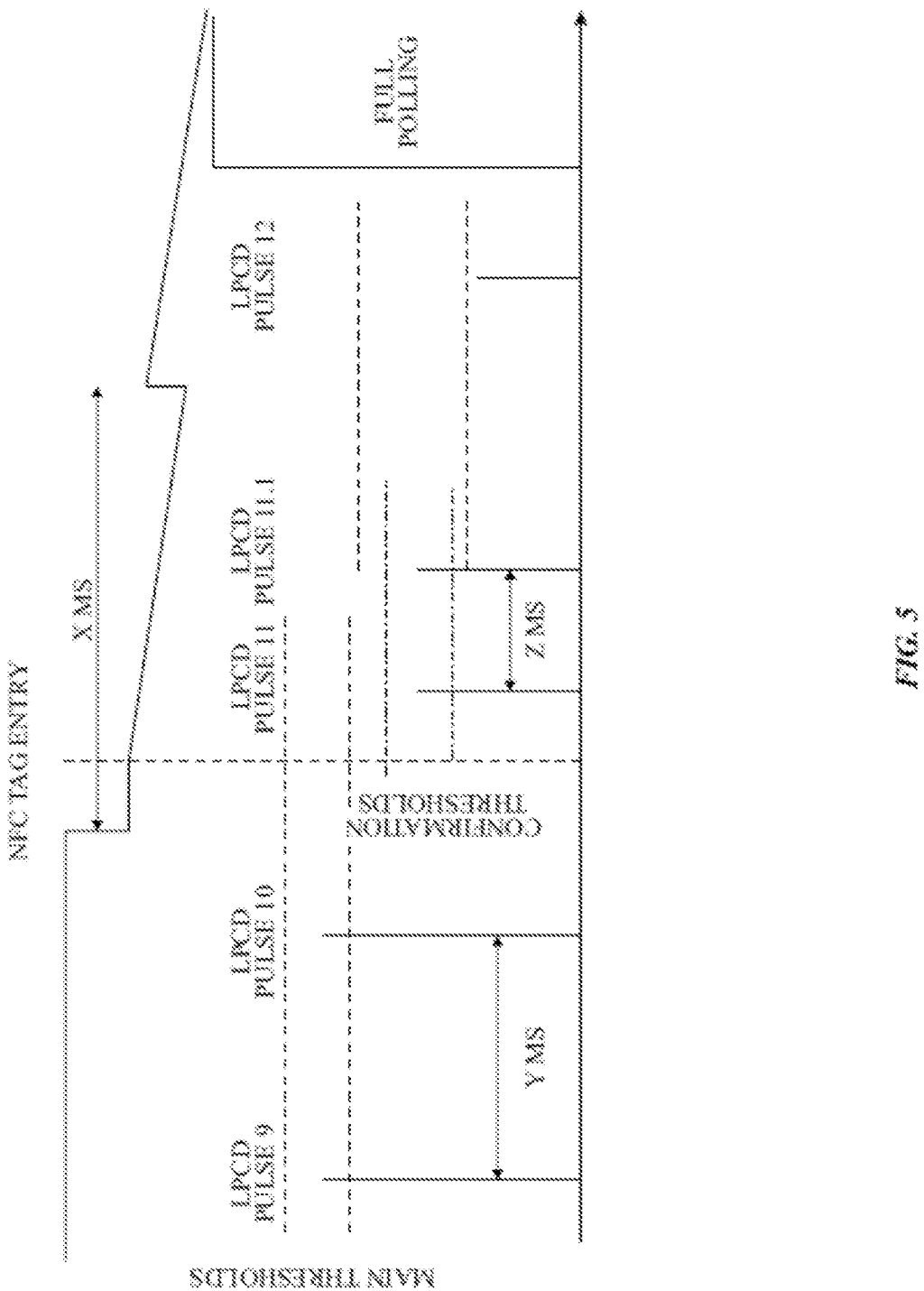
FIG. 5 illustrates an example timing diagram corresponding to transmitting a confirmation pulse signal to determine whether the detected change in measurement parameters should be attributed to the presence of an NFC device when a slowly moving NFC device is present in accordance with one or more implementations.

FIG. 5 illustrates an example timing diagram corresponding to transmitting a confirmation pulse signal to determine whether the detected change in measurement parameters should be attributed to the presence of an NFC device when a slowly moving NFC device is present in accordance with one or more implementations. While FIG. 5 is described with reference to the electronic device 102 as an NFC reader, it is possible to use any of the electronic devices 102-106 as the NFC reader device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

For explanatory purposes, FIG. 5 is described with respect to variation in antenna impedance; however, variation in other measurement parameter(s) (e.g., amplitude, phase, and/or transmission current) may be used instead of, or as a supplement to, variation in antenna impedance. FIG. 5 illustrates an example of detecting the electronic device 108 (e.g., passive tag) either slowly approaching or slowly leaving the electronic device 102.

As shown, the antenna impedance at LPCD pulse 11 falls outside of the main thresholds. In response, the electronic device 102 sets the confirmation thresholds around the antenna impedance at LPCD pulse 11 and sends a confirmation pulse signal (e.g., LPCD pulse 11.1) Z ms after LPCD pulse 11. The antenna impedance at LPCD pulse 11.1 is within the confirmation thresholds and therefore the electronic device 102 does not trigger full polling. However, the electronic device 102 adjusts the main thresholds around the antenna impedance at LPCD pulses 11 and 11.1

The antenna impedance at LPCD pulse 12 is outside of the adjusted main thresholds. However, since the variation from LPCD pulse 11.1 to LPCD pulse 12 is the same sign/direction (e.g., negative/down), from the variation from LPCD pulse 10 to LPCD pulse 11, the electronic device 102 bypasses transmitting another confirmation pulse signal and instead immediately initiates the full polling.

FIG. 6 illustrates an example of transmitting a signal by an active NFC device based on an interval by which pulse signals are received from an NFC reader device in accordance with one or more implementations. In the example of FIG. 6, the electronic device 104 is illustrated as an NFC reader device, for reading data via NFC from the electronic device 102. The electronic device 102 is an active NFC device. While FIG. 6 references illustrates the electronic devices 102-104, it is possible to use any of the electronic devices 102-106 as the NFC reader device, and any of the electronic devices 102-104 as the other, active NFC device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In FIG. 6, during a first polling corresponding to LPCD, the electronic device 104 sends multiple pulse signals at a predefined duration and a predefined interval. As described above, the electronic device 104 (e.g., via an NFC controller input pin) may be configured to measure various parameters (e.g., amplitude, impedance, phase and/or transmission current) from the antenna 208, and to compare these parameters to measurements at previous intervals in order to determine when to initiate full polling (e.g., with the electronic device 102).

In one or more implementations, due to physical constraints, the NFC antenna on the other NFC device (e.g., the electronic device 102) may be small. This may result in small loading on the antenna 208 of the electronic device 104. Moreover, due to the posture in handling the electronic device 102 (e.g., as a mobile device, or in other cases such as a wearable device) and/or due to use cases such as positioning of the electronic device 104 (e.g., as a stationary and/or mobile payment terminal), the electronic device 102 may be positioned at a sub-optimal angle relative the electronic device 104, thereby further reducing the loading on the antenna 208 of the electronic device 104. As such, the LPCD detection range may be relatively small between the two NFC devices.

In the subject system, the electronic device 102 may be configured to detect the LPCD pulse interval (e.g., Y ms) for the multiple pulse signals transmitted by the electronic device 104. This is shown, for example, in the detect LPCD period 602 operation in FIG. 6. The detection of the LPCD period by the electronic device 102 is discussed in further detail below with respect to FIG. 10.

After detecting the LPCD period, the electronic device 102 may generate and transmit a signal (e.g., a 13.56 MHz carrier or modulate antenna load signal), to increase the amplitude variation (e.g., or other measurement parameter variation) on the antenna 208 of the electronic device 104. This generated signal may be transmitted for a predefined duration (e.g., X ms) and at a predefined time (e.g., starting X/2 ms before expected LPCD pulse from the electronic device 104).

The signal transmitted by the electronic device 102 may be sent with the purpose of impacting one or more measurement parameters associated with the antenna 208 of the electronic device 104, thereby increasing the likelihood of sufficient variation in antenna amplitude (e.g., or other measurement) to trigger full polling (and/or transmission of a confirmation pulse signal) by the electronic device 104. For example, the signal may be transmitted by the electronic device 102, on top of a pulse signal transmitted by the second device 104, to impact the measurement parameters of the antenna 208. The electronic device 104 may be configured to detect a change in measurement parameters (e.g., amplitude) on the antenna 208 based on the measurement parameters being outside of one or more thresholds, as previously discussed.

In one or more implementations, the signal transmitted by the electronic device 102 may be in phase with the pulse signal transmitted by the electronic device 104, such that a measured amplitude is greater than that of the prior pulse signal. Alternatively, the signal transmitted by the electronic device may be out of phase with the pulse signal transmitted by the electronic device 104, such that a measured amplitude is less than that of the prior pulse signal.

Figure 7:
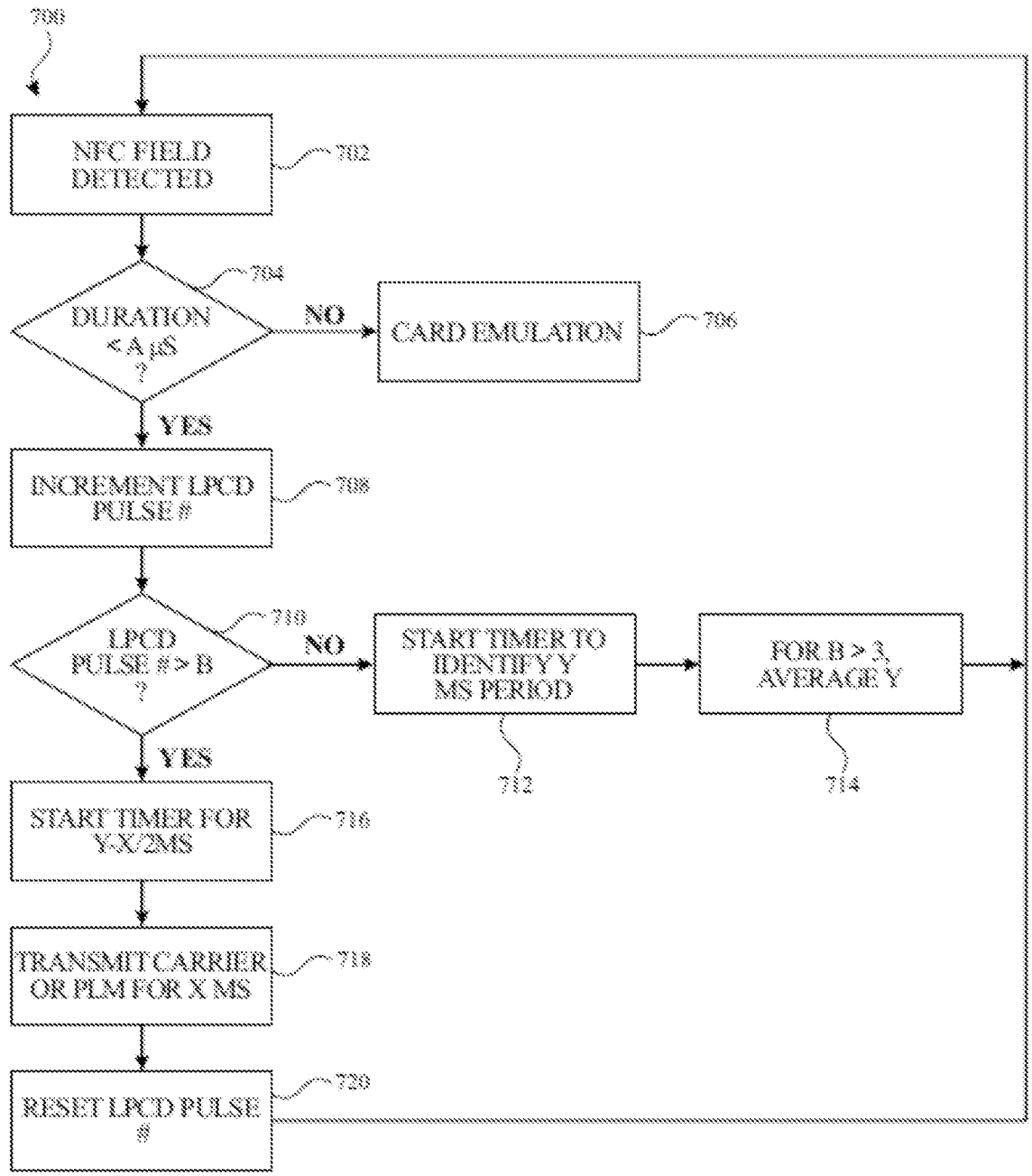
FIG. 7 illustrates a flow diagram of an example process for scheduling transmission of a signal based on an interval at which pulse signals are received in accordance with one or more implementations.

FIG. 7 illustrates a flow diagram of an example process for scheduling transmission of a signal based on an interval at which pulse signals are received in accordance with one or more implementations. For explanatory purposes, the process 700 is primarily described herein with reference to the electronic devices 102-104 of FIG. 1. However, the process 700 is not limited to the electronic devices 102-104 of FIG. 1, and one or more blocks (or operations) of the process 700 may be performed by one or more other components of the electronic devices 102-104 and/or by other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 102 detects the NFC field (e.g., RF field) transmitted by the electronic device 104 (702). The electronic device 102 determines whether the duration of the detected field is less than a first predefined value of A μs (704). In a case where the duration is greater or equal to A μs, this may indicate that the distance and/or angle between the electronic device 102 and the electronic device 104 is sufficient for full polling (e.g., with or without transmission of a confirmation pulse signal), thereby initiating card emulation (706). During full polling, for example, the electronic device 104 may activate hardware or firmware, for performing a transaction with the electronic device 102. In one or more implementations, the full polling may include any operations necessary to perform the transaction, such as a handshake and/or initiation between the electronic device 102 and the electronic device 104.

In a case where the duration is less than the predefined value of A μs, this may indicate that the distance and/or angle between the electronic device 102 and the electronic device 104 is insufficient for full polling. Thus, the electronic device 102 may initiate a process to schedule transmission of a signal (e.g., a 13.56 MHz carrier or modulate antenna load signal) to the electronic device 104, in order to increase the amplitude variation (e.g., or variation of another measurement parameter) for the pulse signal transmitted via the antenna 208 of the electronic device 104.

As part of this scheduling, the electronic device 102 may detect the LPCD pulse interval (e.g., Y ms) for the pulse signals transmitted by the electronic device 104. In one or more implementations, the LPCD pulse interval may be determined by averaging the interval for multiple LPCD pulse signals. Thus, the electronic device 102 may increment an LPCD pulse count (708). In one or more implementations, the LPCD pulse count may be initialized at value of 0.

The electronic device 102 determines whether the LPCD pulse count exceeds a predefined count of B, which may be the minimum number of pulse signals to determine a reliable average periodicity of the pulse signal transmissions (710). If the LPCD pulse count does not exceed the predefined count of B, the electronic device 102 may start a timer to identify the duration (e.g., Y ms) for the current interval (712). The electronic device may then update an average the value of Y when B is greater than 3 (714), and return to detecting the NFC field provided by the electronic device 104 (702).

If the LPCD pulse count exceeds the predefined count of B, the electronic device 102 may start a timer for Y−X/2 ms, where X is a predefined duration for the signal to be sent by the electronic device 102 (716). Thus, the electronic device 102 schedules the signal to start X/2 ms before the next expected LPCD pulse signal from the electronic device 104, so as to increase the likelihood that the signal is transmitted at the same time as the pulse signal transmitted by the electronic device 104. The electronic device 102 transmits the scheduled signal (e.g., as a carrier signal or via passive load modulation (PLM)) for the duration of X ms (718). As noted above, the scheduled signal may be sent with the purpose of increasing the amplitude variation on the antenna 208 of the electronic device 104, so as to be sufficient for full polling. The electronic device 102 then resets the LPCD pulse count (720) and returns to detecting the NFC field provided by the electronic device 104 (702).

Figure 8:
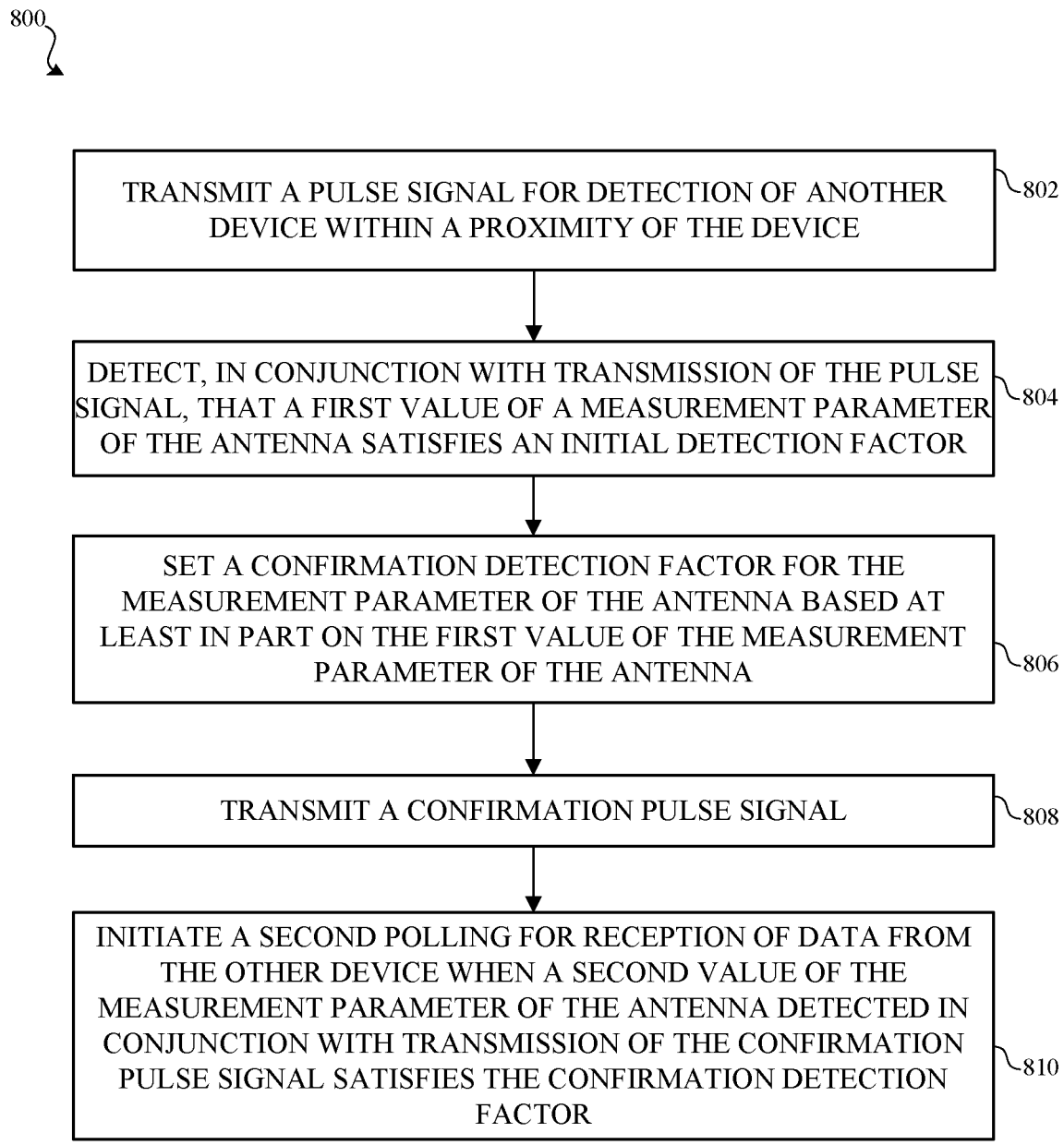
FIG. 8 illustrates a flow diagram of an example process for detecting the presence of an NFC device in accordance with one or more implementations.

FIG. 8 illustrates a flow diagram of an example process for detecting the presence of an NFC device in accordance with one or more implementations. For explanatory purposes, the process 800 is primarily described herein with reference to the electronic devices 102-104 of FIG. 1. However, the process 800 is not limited to the electronic devices 102-104 of FIG. 1, and one or more blocks (or operations) of the process 800 may be performed by one or more other components of the electronic devices 102-104 and/or by other suitable devices. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

The electronic device 102 transmits a pulse signal for detection of another device (e.g., the electronic device 104) within proximity of the electronic device 102 (802). In one or more implementations, the other device may correspond to a passive tag (e.g., the electronic device 108) or to a device emulating a passive tag.

The electronic device 102 detects, in conjunction with transmission of the pulse signal, that a first value of a measurement parameter of the antenna 208 satisfies an initial detection factor (804). The measurement parameter of the antenna 208 may include at least one of an amplitude, an impedance, a phase or a transmission current associated with the antenna 208.

In response to detecting that the first value satisfies the initial detection factor, the electronic device 102 sets a confirmation detection factor for the measurement parameter of the antenna 208 based at least in part on the first value of the measurement parameter of the antenna 208 (806), and transmits a confirmation pulse signal (808).

The electronic device 102 initiates a second polling for reception of data from the other device when a second value of the measurement parameter of the antenna 208 detected in conjunction with transmission of the confirmation pulse signal satisfies the confirmation detection factor (810). The first value of the measurement parameter may satisfy the initial detection factor when the first value of the measurement parameter differs from a prior value of the measurement parameter detected in conjunction with transmission of a prior pulse signal by at least a first threshold amount. The second value of the measurement parameter may satisfy the confirmation detection factor when the second value of the measurement parameter differs from the first value of the measurement parameter by at least a second threshold amount.

The pulse signal may be transmitted a first amount of time after the transmission of the prior pulse signal and the confirmation pulse signal may be transmitted a second amount of time after the transmission of the pulse signal, the second amount of time being less than the first amount of time. The electronic device 102 may transmit another pulse signal for detection of the other device in response to detecting that the first value of the measurement parameter does not satisfy the initial detection factor, where the other pulse signal is transmitted the first amount of time after transmission of the pulse signal.

The electronic device 102 may transmit another confirmation pulse signal when the second value of the measurement parameter of the antenna 208 detected in conjunction with transmission of the confirmation pulse signal does not satisfy the confirmation detection factor. The electronic device 102 may initiate the second polling for reception of data from the other device when a third value of the measurement parameter of the antenna 208 detected in conjunction with transmission of the other confirmation pulse signal satisfies the confirmation detection factor.

The electronic device 102 may, when the second value of the measurement parameter of the antenna 208 detected in conjunction with transmission of the confirmation pulse signal does not satisfy the confirmation detection factor, adjust the initial detection factor based at least in part on the second value of the measurement parameter, and transmit another pulse signal for detection of the other device within proximity of the electronic device 102.

Figure 9:
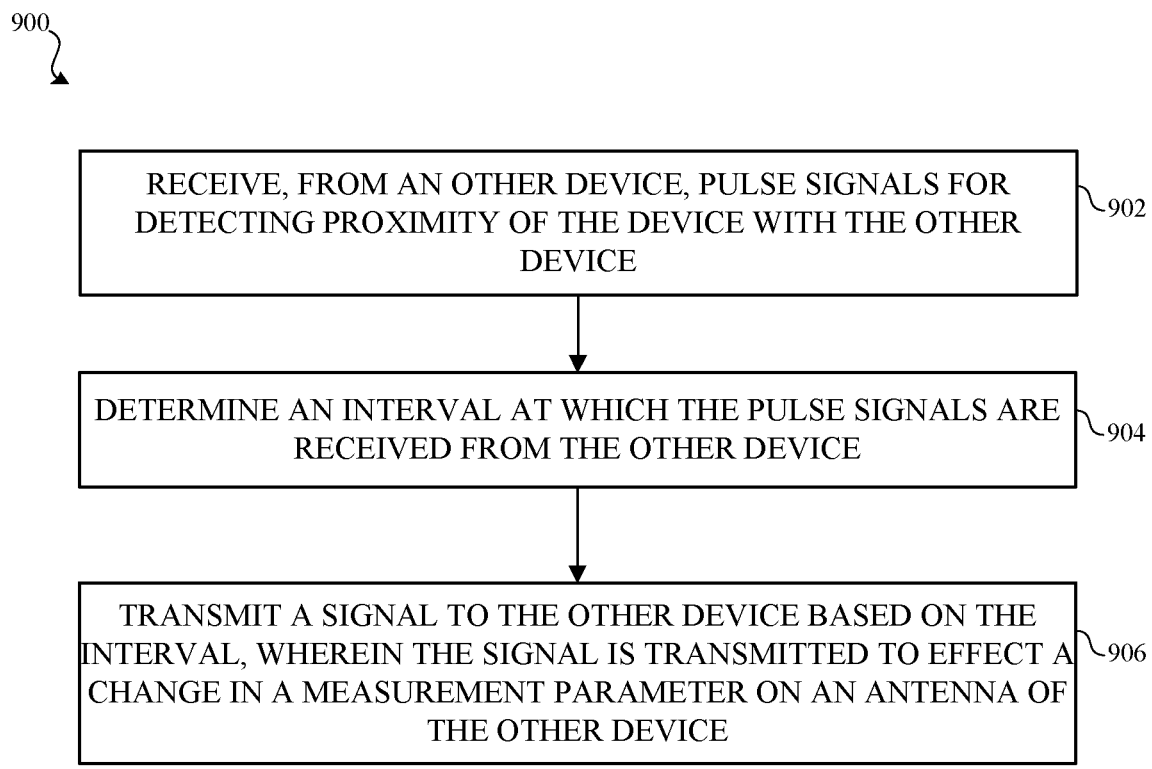
FIG. 9 illustrates a flow diagram of an example process which may increase the detection range of an NFC reader device in accordance with one or more implementations.

FIG. 9 illustrates a flow diagram of an example process which may increase the detection range of an NFC reader device in accordance with one or more implementations. For explanatory purposes, the process 900 is primarily described herein with reference to the electronic devices 102-104 of FIG. 1. However, the process 900 is not limited to the electronic devices 102-103 of FIG. 1, and one or more blocks (or operations) of the process 900 may be performed by one or more other components of the electronic devices 102-104 and/or by other suitable devices. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

The electronic device 102 receives, from another device (e.g., the electronic device 104), pulse signals for detecting proximity of the electronic device 102 with the electronic device 104 (902). The electronic device 102 determines an interval at which the pulse signals are received from the electronic device 104 (904). The electronic device 102 may determine the interval by averaging intervals for a predetermined number of the pulse signals.

The electronic device 102 transmits a signal to the electronic device 104 based on the interval, where the signal is transmitted to effect a change in a measurement parameter on an antenna of the electronic device 104 (906). The signal may include a passive load modulation. The measurement parameter of the antenna may include at least one of an amplitude, an impedance, a phase or a transmission current associated with the antenna.

The electronic device 102 may determine when the electronic device 104 is expected to transmit a subsequent pulse signal based at least in part on the determined interval. The signal may be transmitted over the subsequent pulse signal. The electronic device 102 may transmit the signal at a midpoint of the determined interval from one of the pulse signals received prior to the subsequent pulse signal and for a duration equal to the determined interval. The signal may be transmitted in phase with the subsequent pulse signal, such that an amplitude detected at the electronic device 104 differs from a prior amplitude detected for one or more of the pulse signals. The signal may be transmitted out of phase with the subsequent pulse signal, such that an amplitude detected at the electronic device 104 differs from a prior amplitude detected for one or more of the pulse signals.

Figure 10:
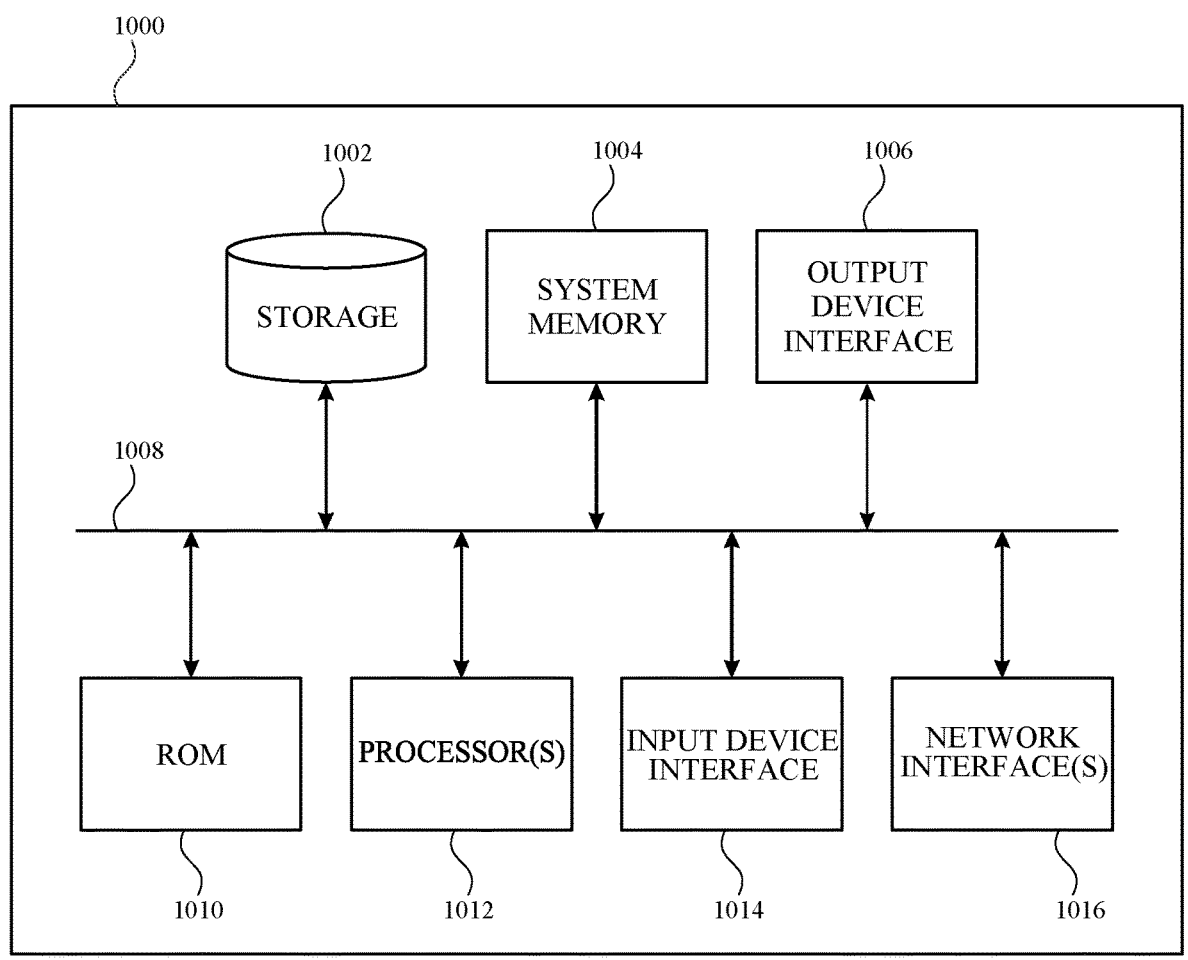
FIG. 10 illustrates an example electronic system with which aspects of the subject technology may be implemented in accordance with one or more implementations.

FIG. 10 illustrates an electronic system 1000 with which one or more implementations of the subject technology may be implemented. The electronic system 1000 can be, and/or can be a part of, one or more of the electronic devices 102-106 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
    a memory; and
    at least one processor configured to:
        determine, based at least in part on a periodicity of pulse signals received from an other device, a time when the other device is expected to transmit a subsequent pulse signal; and
        transmit a signal to the other device based on the determined time when the other device is expected to transmit the subsequent pulse signal.
2. The device of claim 1, wherein the at least one processor is further configured to determine whether a pulse count of the pulse signals exceeds a predefined minimum number of pulse signals to reliably determine the periodicity of the pulse signals.
3. The device of claim 2, wherein the at least one processor is further configured to start a timer for a predefined duration responsive to determining that the pulse count of the pulse signals exceeds the predefined minimum number.
4. The device of claim 3, wherein the predefined duration is less than an interval at which the pulse signals have been received from the other device.
5. The device of claim 4, wherein the predefined duration is less than the interval by a predefined amount.
6. The device of claim 5, wherein the at least one processor is configured to transmit the signal by starting transmission of the signal at the end of the timer.
7. The device of claim 6, wherein the at least one processor is further configured to transmit the signal by continuing to transmit the signal for an amount of time that is greater than the predefined amount.
8. The device of claim 7, wherein the at least one processor is further configured to transmit the signal by transmitting the signal as a carrier signal or via passive load modulation.
9. The device of claim 1, wherein the signal is transmitted over at least a portion of the subsequent pulse signal.
10. A method, comprising:
    determining, by a first device, a time at which a second device is expected to transmit an upcoming pulse signal based a periodicity of a plurality of prior pulse signals that have been received from the second device; and
    transmitting a signal to the second device based on the determined time at which the second device is expected to transmit the upcoming pulse signal.
11. The method of claim 10, further comprising determining whether a pulse count of the prior pulse signals exceeds a predefined minimum number of pulse signals to reliably determine the periodicity of the prior pulse signals.
12. The method of claim 11, further comprising starting a timer for a predefined duration responsive to determining that the pulse count of the prior pulse signals exceeds the predefined minimum number.
13. The method of claim 12, wherein the predefined duration is less than an interval at which the plurality of prior pulse signals have been received from the second device.
14. The method of claim 13, wherein the predefined duration is less than the interval by a predefined amount.
15. The method of claim 14, wherein transmitting the signal comprises starting transmission of the signal at the end of the timer.
16. The method of claim 15, wherein transmitting the signal comprises continuing to transmit the signal for an amount of time that is greater than the predefined amount.
17. A non-transitory computer-readable medium storing instructions which, when executed by one or more processors, cause the one or more processors to perform operations comprising:
    determining, by a first device, a time at which a second device is expected to transmit an upcoming pulse signal based on a periodicity of a plurality of prior pulse signals that have been received from the second device; and
    transmitting a signal to the second device based on the determined time at which the second device is expected to transmit the upcoming pulse signal.
18. The non-transitory computer-readable medium of claim 17, the operations further comprising determining whether a pulse count of the prior pulse signals exceeds a predefined minimum number of pulse signals to reliably determine the periodicity of the prior pulse signals.

19. The non-transitory computer-readable medium of claim 18, the operations further comprising starting a timer for a predefined duration responsive to determining that the pulse count of the prior pulse signals exceeds the predefined minimum number.

20. The non-transitory computer-readable medium of claim 19, wherein the predefined duration is less than an interval at which the plurality of prior pulse signals have been received from the second device, and wherein the predefined duration is less than the interval by a predefined amount.

21. The non-transitory computer-readable medium of claim 20, wherein transmitting the signal comprises:
 starting transmission of the signal at the end of the timer; and
 continuing to transmit the signal for an amount of time that is greater than the predefined amount.

* * * * *